(12) United States Patent
Miyai

(10) Patent No.: US 9,427,932 B2
(45) Date of Patent: *Aug. 30, 2016

(54) INTERLAYER FILM FOR LAMINATED GLASS AND LAMINATED GLASS

(71) Applicant: Sekisui Chemical Co., Ltd., Osaka-shi (JP)

(72) Inventor: Jiro Miyai, Koka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,774

(22) Filed: May 19, 2015

(65) Prior Publication Data

US 2015/0258747 A1    Sep. 17, 2015

Related U.S. Application Data

(63) Continuation of application No. 14/193,458, filed on Feb. 28, 2014, now Pat. No. 9,067,386, which is a continuation of application No. 13/230,400, filed on Sep. 12, 2011, now Pat. No. 8,695,756, which is a (Continued)

(30) Foreign Application Priority Data

May 12, 2006    (JP) ................................. 2006-134200

(51) Int. Cl.
*B32B 17/10*    (2006.01)
*B32B 17/06*    (2006.01)

(Continued)

(52) U.S. Cl.
CPC .............. *B32B 3/263* (2013.01); *B32B 17/06* (2013.01); *B32B 17/10* (2013.01);

(Continued)

(58) Field of Classification Search
CPC ............ B32B 17/10; B32B 17/10761; B32B 17/10036; B32B 17/10568
USPC ........ 181/289, 286; 428/172, 215, 426, 436, 428/437
See application file for complete search history.

(56) References Cited

U.S. PATENT DOCUMENTS 3,762,988 A * 10/1973 Clock ............... B32B 17/10036
428/215
4,943,140 A * 7/1990 Woodard .......... B32B 17/10174
219/203

(Continued)

FOREIGN PATENT DOCUMENTS

EP    0420228 A2    4/1991
EP    420228 A2 *  4/1991    ............. G02B 27/00

(Continued)

OTHER PUBLICATIONS

Extended European Search Report issued in related European Application No. 07743194.8 on Feb. 6, 2012.

(Continued)

*Primary Examiner* — David Warren
*Assistant Examiner* — Christina Schreiber
(74) *Attorney, Agent, or Firm* — Polsinelli PC

(57) ABSTRACT

It is an object of the present invention to provide an interlayer film for a laminated glass excellent in a sound-insulating property, which is preferably usable for a head up display and the like wherein a driver can look at the front view and an instrument display simultaneously without requiring to look down, and to provide a laminated glass. The present invention is directed to interlayer film for a laminated glass, which comprises at least a pair of protection layers and a sound-insulating layer sandwiched between the pair of the protection layers, and which has a wedge shape as a cross-sectional shape, a wedge angle θ of 0.1 to 0.7 mrad, the maximum thickness of 2000 μm or thinner, and the minimum thickness of 400 μm or thicker, the minimum thickness of the sound-insulating layer being 20 μm or thicker.

9 Claims, 1 Drawing Sheet

Related U.S. Application Data continuation of application No. 12/983,376, filed on Jan. 3, 2011, now Pat. No. 8,033,360, which is a continuation of application No. 11/883,177, filed as application No. PCT/JP2007/059759 on May 11, 2007, now Pat. No. 7,886,871.

(51) Int. Cl.

| | | |
|---|---|---|
| *B32B 7/02* | (2006.01) | |
| *B32B 3/00* | (2006.01) | |
| *E04B 1/82* | (2006.01) | |
| *E04B 9/00* | (2006.01) | |
| *B32B 3/26* | (2006.01) | |
| *G02B 27/01* | (2006.01) | |
| *B32B 27/06* | (2006.01) | |
| *B32B 27/30* | (2006.01) | |
| *E04B 1/88* | (2006.01) | |
| *B32B 27/08* | (2006.01) | |

(52) U.S. Cl.
CPC .. *B32B 17/10036* (2013.01); *B32B 17/10568* (2013.01); *B32B 17/10761* (2013.01); *B32B 17/10853* (2013.01); *B32B 27/06* (2013.01); *B32B 27/08* (2013.01); *B32B 27/30* (2013.01); *B32B 27/306* (2013.01); *E04B 1/88* (2013.01); *G02B 27/01* (2013.01); *G02B 27/0101* (2013.01); *B32B 2307/102* (2013.01); *B32B 2457/20* (2013.01); *G02B 2027/0121* (2013.01); *Y10T 428/24479* (2015.01); *Y10T 428/24612* (2015.01); *Y10T 428/24967* (2015.01); *Y10T 428/3163* (2015.04); *Y10T 428/31627* (2015.04)

(56) References Cited

U.S. PATENT DOCUMENTS

| | | | | |
|---|---|---|---|---|
| 5,013,134 A * | 5/1991 | Smith | ............... | B32B 17/10568 345/7 |
| 5,190,826 A * | 3/1993 | Asahina | ............ | B32B 17/10009 181/176 |
| 5,340,654 A * | 8/1994 | Ueda | ................. | B32B 17/10009 427/437 |
| 5,615,040 A * | 3/1997 | Watanabe | ......... | B32B 17/10036 349/167 |
| 6,383,647 B1 * | 5/2002 | Shohi | ................ | B32B 17/10761 428/436 |
| 6,387,516 B2 * | 5/2002 | Shichiri | ............ | B32B 17/10036 428/332 |
| 6,506,487 B2 * | 1/2003 | Nagai | ............... | B32B 17/10036 428/328 |
| 6,586,103 B2 * | 7/2003 | Shohi | ................ | B32B 17/10761 428/436 |
| 6,686,032 B1 * | 2/2004 | Nagai | ............... | B32B 17/10036 428/212 |
| 6,733,872 B2 * | 5/2004 | Nagai | ............... | B32B 17/10036 428/215 |
| 6,866,918 B2 * | 3/2005 | Sauer | ..................... | B32B 17/10 296/84.1 |
| 7,074,487 B2 * | 7/2006 | Shichiri | ............ | B32B 17/10036 428/332 |
| 7,121,380 B2 * | 10/2006 | Garnier | ................... | B32B 17/10 156/99 |
| 7,886,871 B2 * | 2/2011 | Miyai | ............... | B32B 17/10568 181/286 |
| 8,033,360 B2 * | 10/2011 | Miyai | ............... | B32B 17/10568 181/286 |
| 2002/0120916 A1 | 8/2002 | Snider | | |
| 2002/0150744 A1 * | 10/2002 | Nagai | ............... | B32B 17/10036 428/215 |
| 2004/0053006 A1 * | 3/2004 | Omizu | ............ | B32B 17/10036 428/156 |
| 2005/0158520 A1 * | 7/2005 | Freeman | .................. | B32B 3/02 428/172 |
| 2006/0210776 A1 * | 9/2006 | Lu | ........................... | B32B 17/10 428/192 |
| 2007/0009714 A1 * | 1/2007 | Lee | .................. | B32B 17/10568 428/172 |
| 2007/0148472 A1 * | 6/2007 | Masaki | ............ | B32B 17/10036 428/426 |
| 2007/0231584 A1 * | 10/2007 | Hasegawa | ......... | B32B 17/10339 428/428 |
| 2009/0294212 A1 * | 12/2009 | Miyai | ............... | B32B 17/10568 181/289 |
| 2013/0128342 A1 * | 5/2013 | Mitarai | ............ | B32B 17/10036 359/359 |
| 2013/0149503 A1 * | 6/2013 | Yamamoto | ........ | B32B 17/10568 428/172 |

FOREIGN PATENT DOCUMENTS

| | | |
|---|---|---|
| EP | 1281690 A1 | 2/2003 |
| JP | 04-502525 | 5/1992 |
| JP | 08-026785 A | 1/1996 |
| JP | H11-130481 A | 5/1999 |
| JP | 2000-044296 A | 2/2000 |
| JP | 2001-106554 A | 4/2001 |
| JP | 03-209210 B2 | 9/2001 |
| JP | 2001316140 A | 11/2001 |
| JP | 2002-326847 A | 11/2002 |
| JP | 2004-050750 A | 2/2004 |
| JP | 2007-223883 A | 9/2007 |
| WO | WO-9946213 A1 | 9/1999 |
| WO | WO-2006/101960 A1 | 9/2006 |
| WO | WO-2006122305 A2 | 11/2006 |

OTHER PUBLICATIONS

Office Action issued in counterpart European Application No. 07743194.8 dated Oct. 8, 2012.

Office Action for counterpart EP Appln. No. 07743194.8 issued Oct. 19, 2015.

\* cited by examiner

INTERLAYER FILM FOR LAMINATED GLASS AND LAMINATED GLASS

CROSS-REFERENCE TO RELATED APPLICATIONS

This application is a continuation application of U.S. patent application Ser. No. 14/193,458, filed Feb. 28, 2014, which is a continuation application of U.S. patent application Ser. No. 13/230,400, filed Sep. 12, 2011, which is a continuation application of U.S. patent application Ser. No. 12/983,376, filed Jan. 3, 2011, now U.S. Pat. No. 8,033,360, which application is a continuation of U.S. patent application Ser. No. 11/883,177, filed Aug. 31, 2007, now U.S. Pat. No. 7,886,871, which application is a 35 U.S.C. 371 National Stage Application of International Application No. PCT/JP2007/059759, filed May 11, 2007, which application claims priority to Japanese Application No. 2006-134200, filed May 12, 2006, the contents of each which are incorporated herein by reference in their entireties.

TECHNICAL FIELD

The present invention relates to an interlayer film for a laminated glass excellent in a sound-insulating property, which is preferably usable for a head up display and the like wherein a driver can look at the front view and an instrument display simultaneously without requiring to look down, and relates to a laminated glass.

BACKGROUND ART

As so-called front glass, generally laminated glass composed of two opposed plate-like glass sheets and an interlayer film for a laminated glass sandwiched between the glass sheets has been used for the front face of an automobile, an aircraft or the like.

In recent years, from a viewpoint of safety improvement, with respect to, for example, a front glass for an automobile, it has been highly required to display an instrument display such as a speed information, which is automotive driving data, as a head up display (HUD) in the same visible field as the front glass.

Various kinds of HUD mechanisms have been developed so far. For example, there is a HUD mechanism whose HUD display part is not in the front glass surface and by which the speed information and the like transmitted from a control unit is reflected to the front glass from a display unit on an instrumental panel to enable a driver to see the information at the same position as the front glass (that is, in the same visible field). For such a mechanism, since the laminated glass composing the front glass comprises two parallel glass sheets, there is a defective point that the instrument display reflected in the visible field of the driver is seen double.

To deal with such a problem, Patent Document 1 discloses a laminated glass using an interlayer film for a laminated glass with a wedge shape having a prescribed wedge angle.

Such a laminated glass enables a convergence of the instrument display reflected by one glass sheet and the instrument display reflected by the other glass sheet upon one point in the visible field of the driver by adjusting the wedge angle, and the laminated glass can solve the conventional problem that the instrument display is seen double, and the driver's visible field is never interfered.

However, such a laminated glass has a problem of inferior sound-insulating property in particular.

Patent Document 1: Japanese Kokai Publication Hei-4-502525

DISCLOSURE OF THE INVENTION

Problems to be Solved by the Invention

In view of the above-mentioned state of the art, the present invention aims to provide an interlayer film for a laminated glass excellent in a sound-insulating property, which is preferably usable for a head up display and the like wherein a driver can look at the front view and an instrument display simultaneously without requiring to look down, and aims to provide a laminated glass.

Means for Solving the Problems

The present invention provides interlayer film for a laminated glass, which comprises at least a pair of protection layers and a sound-insulating layer sandwiched between the pair of the protection layers, and which has a wedge shape as a cross-sectional shape, a wedge angle θ of 0.1 to 0.7 mrad, the maximum thickness of 2000 μm or thinner, and the minimum thickness of 400 μm or thicker, the minimum thickness of the sound-insulating layer being 20 μm or thicker.

Hereinafter, the present invention will be described in detail.

The present inventors made various investigations concerning causes of the inferiority of the sound-insulating property of the laminated glass using the interlayer film for a laminated glass with a wedge shape and accordingly have found that since the interlayer film for a laminated glass has a wedge angle, the thickness of the end forming the wedge angle is extremely thin as compared with the other end and sound vibration is transmitted to the inside of a vehicle through the thin portion. Further, the inventors of the present invention have found that the problem that the instrument display reflected to the visible field of a driver is seen double cannot be solved only by making the thickness of the end forming the edge angle in the interlayer film for a laminated glass thick enough not to transmit the sound vibration. Therefore, the inventors of the present invention have made further investigations to find that an interlayer film for a laminated glass having a sound-insulating layer and a protection layer with prescribed thickness and having a wedge angle in a prescribed range and a specified shape overcomes the problems in terms of the lightweight, cost and the like, has sufficient sound-insulating property and penetration resistance, enables a driver to simultaneously see the front view, a speed display and the like with no need for the driver to look down, and is preferably usable for a head up display. These findings have now led to completion of the present invention.

An interlayer film for a laminated glass of the present invention comprises at least a pair of protection layers and a sound-insulating layer sandwiched between the pair of the protection layers.

The minimum thickness of the sound-insulating layer is 20 μm in the lower limit. If it is thinner than 20 μm, sufficient sound-insulating property cannot be obtained. The lower limit is preferably 30 μm and more preferably 40 μm. The upper limit is preferably 300 μm and more preferably 200 μm.

As the thickness of the sound-insulating layer becomes thicker, a higher sound-insulating property can be obtained. The cross-sectional shape of the sound-insulating layer may be a wedge shape in consideration of the easiness in terms of formation and the like. In the case where the sound-insulating layer of the interlayer film for a laminated glass hats a wedge shape, it has an excellent defoaming property of preventing foaming in the laminated glass.

In this description, the wedge shape means a shape which is wide in one end and becomes narrower toward the other end. Practical examples of the shape may be a trapezoidal shape and a triangular shape.

The sound-insulating layer may have partially a colored hand.

The colored band can be obtained, for example, by inserting a polyvinyl acetal resin mixed with a coloring agent in a layer and extrusion-molding the resin at the time of extrusion-molding the sound-insulating layer.

The sound-insulating layer is not particularly limited, however it is preferably to form the layer, for example, by using a plasticizer and a polyvinyl acetal resin.

The plasticizer is not particularly limited and may include, for example, organic plasticizers such as monobasic organic acid esters and polybasic organic acid esters; and organic phosphoric acid ester plasticizers such as organic phosphoric acid esters and organic phosphorous acid esters.

The monobasic organic acid ester plasticizers are not particularly limited and may include, for example, glycol esters obtained by reaction with glycols such as triethylene glycol, tetraethylene glycol, and tripropylene glycol and monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid. Among them, triethylene glycol esters such as triethylene glycol dicaproate, triethylene glycol di-2-ethylbutanoate, triethylene glycol di-n-octanoate, triethylene glycol di-2-ethylhexanoate (3GO) are preferable.

The polybasic organic acid ester plasticizers are not particularly limited and may include, for example, esters obtained by reaction of straight chain or branched alcohols having 4 to 8 carbon atoms and polybasic organic acids such as adipic acid, sebacic acid, and azelaic acid. Among them, dibutyl sebacate, dioctyl azelate, and dibutylcarbitol adipate are preferable.

The organic phosphoric acid ester plasticizers are not particularly limited and may include, for example, tributoxyethyl phosphate, isodecylphenyl phosphate, and triisopropyl phosphate.

Among the plasticizers, triethylene glycol di-2-ethylbutanoate and triethylene glycol di-2-ethylhexanoate (3GO) are preferably usable in particular.

The content of the plasticizer in the sound-insulating layer is not particularly limited, however since a higher sound-insulating property can be obtained by adding a large quantity of a plasticizer and thereby softening the resin layer and absorbing the vibration of sound, it is preferably 40 parts by weight in the lower limit and 80 parts by weight in the upper limit to 100 parts by weight of a polyvinyl acetal resin. If it is less than 40 parts by weight, the sound-insulating property for the sound in a range about 5000 Hz may sometimes become insufficient and if it exceeds 80 parts by weight, bleeding out of the plasticizer occurs to lower the transparency and the adhesive property of the interlayer film for a laminated glass and the optical distortion of the obtained laminated glass may become significant in some cases. It is more preferably 50 parts by weight in the lower limit and 70 parts by weight in the upper limit.

The polyvinyl acetal resin is not particularly limited, however the sound-insulating layer contains a large quantity of the plasticizer as described above, and therefore, the polyvinyl acetal resin is preferable to have high affinity even for a large quantity of the plasticizer. Particularly preferable examples to be used are a polyvinyl acetal resin having an acetal group having 4 to 5 carbon atoms and having an acetylation degree of 4 to 30% by mole, a polyvinyl acetal resin having an acetal group having 6 to 10 carbon atoms, and a polyvinyl acetal resin having an acetalization degree of 70 to 85% by mole.

The polyvinyl acetal resin can be obtained by acetalization of polyvinyl alcohol with aldehyde and generally includes an acetal group, an acetyl group, and a hydroxy group as side chains in an ethylene chain, which is a main chain.

The average polymerization degree of the polyvinyl alcohol, which is a raw material for producing the polyvinyl acetal resin, is preferably 200 in the lower limit and 5000 in the upper limit. If it is lower than 200, the interlayer film for a laminated glass may sometimes be inferior in the penetration resistance and if it exceeds 5000, the strength of the laminated glass may sometimes become too high to use the glass for a front glass for a vehicle. It is more preferably 500 in the lower limit and 4000 in the upper limit and even more preferably 1000 in the lower limit and 3500 in the upper limit.

An aldehyde having 4 to 5 carbon atoms to be used for producing the polyvinyl acetal resin having an acetal group having 4 to 5 carbon atoms is not particularly limited and may include, for example, n-butyraldehyde, isobutyraldehyde, and valeraldehyde. These aldehydes may be used alone or two or more of them may be used in combination. Among them, n-butyraldehyde and isobutyraldehyde are preferable to be used and n-butyraldehyde is even more preferable to be used in particular. Use of n-butyraldehyde strengthens the adhesive strength between neighboring layers. Further, resins may foe synthesized in the same methods as those for producing commonly used polyvinyl butyral resin.

With respect to the polyvinyl acetal resin having an acetal group having 4 to 5 carbon atoms, the acetylation degree is preferably 4% by mole in the lower limit and 30% by mole in the upper limit. If it is lower than 4% by mole, the sound-insulating property is not exhibited sufficiently in some cases and if it exceeds 30% by mole, the reaction ratio of the aldehyde is considerably lowered in some cases. It is more preferably 8% by mole in the lower limit and 24% by mole in the upper limit and even more preferably 10% by mole in the lower limit.

The acetylation degree is a mole fraction calculated by dividing the average value of the quantity of ethylene groups to which the acetyl group is bonded by the total quantity of ethylene groups in the main chain.

With respect to the polyvinyl acetal resin having an acetal group having 4 to 5 carbon atoms, the acetalization degree is preferably 40% by mole in the lower limit and 69% by mole in the upper limit. If it is lower than 40% by mole, the compatibility for the plasticizer is worsened to make it impossible to add a necessary amount of the plasticizer to exhibit the sound-insulating property in some cases. On the other hand, a polyvinyl acetal resin having the acetalization degree exceeding 69% by mole is inferior in the production efficiency and becomes costly. It is more preferably 50% by mole in the lower limit and 68% by mole in the upper limit.

With respect to the polyvinyl acetal resin having an acetal group having 4 to 5 carbon atoms, a mixture of two or more kind polyvinyl acetal resins obtained by acetalization of polyvinyl alcohol with aldehydes having 4 carbon atoms or aldehydes having 5 carbon atoms. Alternatively, a polyvinyl acetal resin obtained by acetalization of an aldehyde mixture containing an aldehyde other than the aldehyde having 4 to 5 carbon atoms in a range of lower than 30% by weight may be used.

An aldehyde having 6 to 10 carbon atoms to be used for producing the polyvinyl acetal resin containing an acetal group having 6 to 10 carbon atoms is not particularly and may include, for example, aliphatic, aromatic, or alicyclic aldehydes such as n-hexyl aldehyde, 2-ethylbutyraldehyde, n-heptaldehyde, n-octyl aldehyde, n-nonyl aldehyde, n-decyl aldehyde, benzaldehyde, and cinnamaldehyde. These aldehydes may be used alone or two or more of them may be used in combination. Among them, aldehydes having 5 to 8 carbon atoms are preferably usable.

If the number of carbon atoms of the aldehyde exceeds 10, the rigidity of the polyvinyl acetal to be obtained becomes low and the sound-insulating property may be deteriorated in some cases.

With respect to the polyvinyl acetal resin having an acetalization degree of 70 to 85% by mole, the acetalization degree is preferably 70% by mole in the lower limit and 85% by mole in the upper limit. If it is lower than 70% by mole, the sound-insulating property is not exhibited sufficiently in some cases and if it exceeds 35% by mole, the reaction ratio of the aldehyde to be used at the time of producing the polyvinyl acetal resin may be considerably decreased in some cases. It is more preferably 72% by mole in the lower limit and 82% by mole in the upper limit.

The acetalization degree is a mole fraction calculated by dividing the average value of the quantity of ethylene groups to which the acetal group is bonded by the total quantity of ethylene groups in the main chain.

A production method of the polyvinyl acetal resin is not particularly limited and may be, for example, a method for obtaining a resin powder by dissolving polyvinyl alcohol in hot water, keeping the obtained aqueous polyvinyl alcohol solution at a prescribed temperature, adding the aldehyde and a catalyst to the solution, promoting acetalization reaction, keeping the reaction solution at a prescribed high temperature, and thereafter carrying out steps of neutralization, washing with water, and drying.

The sound-insulating layer is sandwiched between a pair of protection layers.

The protection layer prevents the adhesive property between the interlayer film for a laminated glass and glass from lowering because of bleeding out of a large quantity of the plasticizer contained in the sound-insulating layer. Further, the protection layer has a role to provide the penetration resistance to the interlayer film for a laminated glass to be obtained. Further, the protection layer also has a function of adjusting the shape of the entire interlayer film for a laminated glass to be a wedge shape.

The thickness of the protection layer may be adjusted in a manner that the film thickness of the entire interlayer film for a laminated glass is to be in a range as described below and is thus not particularly limited.

The cross-sectional shape of the pair of the protection layers is preferably the wedge shape or a combination of the wedge shape and a rectangular shape.

The protection layer is not particularly limited, however it preferably comprises a polyvinyl acetal resin containing a plasticizer.

The polyvinyl acetal resin to be used for the protection layer is not particularly limited and may be, for example, a polyvinyl acetal resin having an acetylation degree of 3% by mole or lower, 3 to 4 carbon atoms of an acetal group, and an acetalization degree of 60 to 70% by mole.

The plasticizer to be used for the protection layer is not particularly limited and the plasticizers same as those to be used for the sound-insulating layer may be used.

The content of the plasticizer in the protection layer is not particularly limited, however it is preferably 25 parts by Weight in the lower limit and 55 parts by weight in the upper limit to 100 parts by weight of the polyvinyl acetal resin. If it is lower than 25 parts by weight, the adhesive property to the glass may become insufficient in some cases. Further, if it exceeds 55 parts by weight, bleeding out occurs to lower the transparency and the adhesive property of the interlayer film for a laminated glass and the optical distortion of the obtained laminated glass may become significant. It is more preferably 30 parts by weight in the lower limit and 50 parts by weight in the upper limit.

Further, the protection layer may have partially a colored band.

The colored band can be obtained by inserting a polyvinyl acetal resin and the like mixed with a coloring agent in a layer and extrusion-molding the resin at the time of extrusion-molding the protection layer.

In order to adjust the convenience and the shape in the production method, a shape assisting layer may be layered on at least one layer of the pair of the protection layers.

The shape assisting layer is not particularly limited and the resin same as that of the protection layer may foe used.

The thickness of the shape assisting layer may be adjusted in a manner that the film thickness, the wedge angle and the like of the interlayer film for a laminated glass to be obtained are to be in a range as described below.

The sound-insulating layer, the protection layer, and/or the shape assisting layer may contain, if necessary, conventionally known additives such as an ultraviolet ray absorbent, an adhesive strength control agent, a photostabilizer, a surfactant, a flame retardant, an antistatic agent, a moisture prevention agent, and a coloring agent.

The sound-insulating layer, the protection layer, and/or the shape assisting layer are preferable to contain a heat insulating agent.

If the interlayer film for a laminated glass contains the heat insulating agent in any one of the layers, the interlayer film for a laminated glass is provided with an excellent heat insulating property.

The heat insulating agent is not particularly limited and may include, for example, inorganic heat insulating agents such as tin-doped indium oxide, antimony-doped tin oxide, and lanthanum hexaboride; and organic heat insulating agents such as copper complex compounds and phthalocyanine-metal complexes.

Practical Examples of cross-sectional drawings of the interlayer film for a laminated glass of the present invention comprising at least the protection layers and the sound-insulating layer may be those shown in the schematic drawings of FIGS. 1 to 4.

The interlayer film for a laminated glass shown in FIG. 1 comprises the sound-insulating layer 2 with a cross-sectional shape of the rectangular shape sandwiched between the protection layers 1 with a cross-sectional shape of the wedge shape.

The interlayer film for a laminated glass shown in FIG. 2 comprises the sound-insulating layer 2 with a cross-sectional shape of the wedge shape sandwiched between the protection layers 1 with a cross-sectional shape of the wedge shape.

The interlayer film for a laminated glass shown in FIG. 3 comprises the sound-insulating layer 2 with a cross-sectional shape of the rectangular shape sandwiched between the protection layer 1 with a cross-sectional shape of the wedge shape and the protection layer 1 with a cross-sectional shape of the rectangular shape.

The interlayer film for a laminated glass shown in FIG. 4 comprises the sound-insulating layer 2 with a cross-sectional shape of the rectangular shape sandwiched between the protection layers 1 with a cross-sectional shape of the rectangular shape and further a shape assisting layer 3 with a cross-sectional shape of the wedge shape laminated on the surface of one of the protection layer.

Among them, the interlayer film for a laminated glass shown in FIG. 2 is preferably since it has an excellent defoaming property of generating no foam at the time of producing a laminated glass.

The interlayer film for a laminated glass of the present invention comprising at least the protection layers and sound-insulating layer has a wedge angle θ of the cross-section of 0.1 mrad in the lower limit and 0.7 mrad in the upper limit. The wedge angle θ of the cross-section of the interlayer film for a laminated glass means an acute angle formed at the crossing point of extended two sides as shown as the wavy lines in the cross-sectional drawings of FIGS. 1 to 4.

If the wedge angle θ is lower than 0.1 mrad, an instrument display for speed information and the like transmitted from a control unit is seen double and thus cannot display well and if it exceeds 0.7 mrad, the instrument display is seen double in the visible field of a driver. It is more preferably 0.2 mrad in the lower limit and 0.6 mrad in the upper limit The maximum thickness of the interlayer film for a laminated glass of the present invention is 2000 μm in the upper limit. The maximum thickness is the portion 4 as shown in FIG. 1.

If the maximum thickness exceeds 2000 μm, the thickness is too thick to install the laminated glass easily as the front glass in a vehicular body in some cases. It is more preferably 1500 μm in the upper limit.

The minimum thickness of the interlayer film for a laminated glass of the present invention is 400 μm in the lower limit. The minimum thickness is the portion 5 as shown in FIG. 1.

If the minimum thickness is thinner than 400 μm, it becomes impossible to obtain a sufficient sound-insulating property and the penetration resistance to impact becomes weak. It is more preferably 500 μm in the lower limit.

A method for producing the sound-insulating layer, the protection layer, and the shape assisting layer is not particularly limited and may be, for example, methods involving adding a plasticizer and additives, added based on the necessity, to a polyvinyl acetal resin, kneading the mixture, and molding the mixture. The kneading method is not particularly limited and may be, for example, methods using an extruder, a Plastograph, a kneader, a Bumbury's mixer, a calender roll, or the like. Among them, a method using an extruder is preferable since it is suitable for continuous production.

A method for producing the interlayer film for a laminated glass of the present invention comprising at least the sound-insulating layers and protection layer is not particularly limited and may be methods involving producing the protection layers and the sound-insulating layer and thermally laminating the layers; molding the protection layers and the sound-insulating layer by co-extrusion; and molding the protection layers and the sound-insulating layer by co-extrusion, layering the shape assisting layer on the surface of at least one of the protection layers, and thermally laminating the layers.

Since the cross-sectional shape of the interlayer film for a laminated glass is formed in a wedge shape by combining at least shapes of the sound-insulating layers and the protection layer, the sound-insulating property is provided and the speed information and the like transmitted from the control unit can be reflected on the front glass from the display unit of a instrumental panel and therefore, a driver can simultaneously see the front view, speed display and the like without looking down and the interlayer film for a laminated glass can be used preferably for a head up display.

A laminated glass obtained using the interlayer film for a laminated glass of the present invention is also an aspect of the present invention.

The laminated glass of the present invention comprises at least the interlayer film for a laminated glass of the present invention sandwiched between a pair of glass sheets.

The glass sheets to be used are not particularly limited and may be conventionally known transparent plate glass. Further, organic glass of polycarbonate, polymethyl methacrylate or the like may be used in place of inorganic glass.

A method for producing laminated glass of the present invention is not particularly limited and conventionally known methods can be employed.

It is preferable to sandwich only one interlayer film for a laminated glass between a pair of glass sheets since the laminated glass production is easy, however in terms of the properties and functions such as stability, a plurality of interlayer films for a laminated glass may be sandwiched between a pair of glass sheets to produce a laminated glass.

Effects of the Invention

According to the present invention, it is made possible to provide an interlayer film for a laminated glass excellent in a sound-insulating property, which is preferably usable for a head up display and the like wherein a driver can look at the front view and an instrument display simultaneously without requiring to look down, and to provide a laminated glass.

BEST MODE FOR CARRYING OUT THE INVENTION

Hereinafter, the present invention will be described in details with reference to examples, however the present invention is not limited to these examples.

Example 1

(1) Production of a Sound-Insulating Layer

A sound-insulating layer was produced by adding 65 parts by weight of triethylene glycol di-2-ethylhexanoate (3GO) as a plasticizer to 100 parts by weight of a polyvinyl acetal resin having an acetylation degree of 12% by mole, 4 as the number of carbon atoms of the acetal group, and an acetalization degree of 65% by mole, sufficiently kneading the mixture by a mixing roll, and extrusion-molding the mixture. The thickness of the sound-insulating layer was as shown in Table 1.

(2) Production of a Protection Layer

A protection layer was produced by adding 38 parts by weight of triethylene glycol di-2-ethylhexanoate (3GO) as a plasticizer to 100 parts by weight of a polyvinyl acetal resin having an acetylation degree of 1% by mole, 4 as the number of carbon atoms of the acetal group, and an acetalization degree of 68% by mole, sufficiently kneading the mixture by a mixing roll, and extrusion-molding the mixture.

(3) Production of an Interlayer Film for a Laminated Glass

The obtained sound-insulating layer was sandwiched between a pair of protection layers and thermally laminated to produce an interlayer film for a laminated glass with a cross-sectional shape of the wedge shape. The thickness of the interlayer film for a laminated glass and the wedge angle of the cross-section were as shown in Table 1. The cross-sectional shape was as shown in FIG. 2.

Example 2

A sound-insulating layer was produced by adding 65 parts by weight of triethylene glycol di-2-ethylhexanoate (3GO) as a plasticizer to 100 parts by weight of a polyvinyl acetal resin having an acetylation degree of 1% by mole, 6 as the number of carbon atoms ox the acetal group, and an acetalization degree of 65% by mole, sufficiently kneading the mixture by a mixing roll, and extrusion-molding the mixture. The thickness of the sound-insulating layer was as shown in Table 1.

Thereafter, a protection layer was produced and successively an interlayer film for a laminated glass was produced in the same manner as Example 1. The thickness of the interlayer film for a laminated glass and the wedge angle of the cross-section were as shown in Table 1. The cross-sectional shape was as shown in FIG. 2.

Example 3

A sound-insulating layer was produced by adding 63 parts by weight of triethylene glycol di-2-ethylhexanoate (3GO) as a plasticizer to 100 parts by weight of a polyvinyl acetal resin having an acetylation degree of 1% by mole, 4 as the number of carbon atoms of the acetal group, and an acetalization degree of 78% by mole, sufficiently kneading the mixture by a mixing roll, and extrusion-molding the mixture. The thickness of the sound-insulating layer was as shown in Table 1.

Thereafter, a protection layer was produced and successively an interlayer film for a laminated glass was produced in the same manner as Example 1. The thickness of the interlayer film for a laminated glass and the wedge angle of the cross-section were as shown in Table 1. The cross-sectional shape was as shown in FIG. 2.

Comparative Example 1

A sound-insulating layer was produced by adding 65 parts by weight of triethylene glycol di-2-ethylhexanoate. (3GO) as a plasticizer to 100 parts by weight of a polyvinyl acetal resin having an acetylation degree of 12% by mole, 4 as the number of carbon atoms of the acetal group, and an acetalization degree of 65% by mole, sufficiently kneading the mixture by a mixing roll, and extrusion-molding the mixture. The thickness of the sound-insulating layer was as shown in Table 1.

Thereafter, a protection layer was produced and successively an interlayer film for a laminated glass was produced in the same manner as Example 1. The thickness of the interlayer film for a laminated glass and the wedge angle of the cross-section were as shown in Table 1. The cross-sectional shape was as shown in FIG. 2.

Comparative Example 2

A sound-insulating layer was produced by adding 65 parts by weight of triethylene glycol di-2-ethylhexanoate (3GO) as a plasticizer to 100 parts by weight of a polyvinyl acetal resin having an acetylation degree of 12% by mole, 4 as the number of carbon atoms of the acetal group, and an acetalization degree of 65% by mole, sufficiently kneading the mixture by a mixing roll, and extrusion-molding the mixture. The thickness of the sound-insulating layer was as shown in Table 1.

Thereafter, a protection layer was produced and successively an interlayer film for a laminated glass was produced in the same manner as Example 1. The thickness of the interlayer film for a laminated glass and the wedge angle of the cross-section were as shown in Table 1. The cross-sectional shape was as shown in FIG. 2.

Comparative Example 3

A sound-insulating layer was produced by adding 65 parts by weight of triethylene glycol di-2-ethylhexanoate (3GO) as a plasticizer to 100 parts by weight of a polyvinyl acetal resin having an acetylation degree of 12% by mole, 4 as the number of carbon atoms of the acetal group, and an acetalization degree of 65% by mole, sufficiently kneading the mixture by a mixing roll, and extrusion-molding the mixture. The thickness of the sound-insulating layer was as shown in Table 1.

Thereafter, a protection layer was produced and successively an interlayer film for a laminated glass was produced in the same manner as Example 1. The thickness of the interlayer film for a laminated glass and the wedge angle of the cross-section were as shown in Table 1. The cross-sectional shape was as shown in FIG. 2.

Comparative Example 4

A sound-insulating layer was produced by adding 65 parts by weight of triethylene glycol di-2-ethylhexanoate (3GO) as a plasticizer to 100 parts by weight of a polyvinyl acetal resin having an acetylation degree of 12% by mole, 4 as the number of carbon atoms of the acetal group, and an acetalization degree of 65% by mole, sufficiently kneading the mixture by a mixing roll, and extrusion-molding the mixture. The thickness of the sound-insulating layer was as shown in Table 1.

Thereafter, a protection layer was produced and successively an interlayer film for a laminated glass was produced in the same manner as Example 1. The thickness of the interlayer film for a laminated glass and the wedge angle of the cross-section were as shown in Table 1. The cross-sectional shape was as shown in FIG. 2.

<Evaluation>

The following evaluations were carried out for the interlayer films for a laminated glass obtained in Examples 1 to 3 and Comparative Examples 1 to 4. The results are shown in Table 1.

(1) Sound-Insulating Property

Each sample obtained by cutting obtained laminated glass into a size of 300 mm×25 mm was vibrated by a vibration generating apparatus for a damping test (a vibrator G21-005D, manufactured by Shinken Co., Ltd.) and the vibration property obtained at that time was amplified by a mechanical impedance amplifier (XG-81, manufactured by RION Co., Ltd.) and the vibration spectrum was analyzed by an FFT spectrum analyzer (FFT analyzer HP3582A, manufactured by Yokogawa Hewlett Packard).

A graph showing the relation between sound frequency (Hz) and sound transmission loss (dB) at 20° C. was produced from the ratio of loss factor and the resonance frequency of the glass measured in the manner to measure the minimum sound transmission loss (TL value) around a sound frequency of 2000 Hz and the evaluation was carried out based on the following standard. As the TL value is higher, the sound-insulating property is higher.

◯: 35 dB or higher
X: lower than 35 dB.

(2) Occurrence of Double Image

Each obtained laminated glass was disposed at a position of a front glass and display information was reflected upon the laminated glass from a display unit installed in a lower part and occurrence of a double image at a prescribed position was confirmed by eye observation and the evaluation was carried out based on the following standard.

◯: No double image was confirmed.
X: A double image was confirmed.

(3) Defoaming Property Evaluation

A laminate body was produced by sandwiching each interlayer film for a laminated glass between two transparent float glass plates (length 30 cm, width 30 cm, thickness 3 mm).

The obtained laminate body was put in a rubber bag and held at a reduced pressure of −60 kPa (absolute pressure 16 kPa) for 10 minutes and heated in order that the temperature of the laminate body reach 100° C. and then taken out of the rubber bag. Next, it was put in an autoclave and held at a temperature of 140° C. and a pressure of 1.3 MPa for 10 minutes and then taken out of the autoclave after the temperature of the inside of the autoclave was decreased to 50° C. In such a manner, a laminated glass was produced.

The obtained laminated glass was heated in an oven at 200° C. for 2 hours. Next, the laminated glass was taken out of the oven and after 3 hours, the appearance of the laminated glass was observed with eyes. The number of sheets of the laminated glass in which foams with an outer diameter of 1 mm or larger were formed was investigated. The number of the sheets of the laminated glass to be used in the test was 20. As the number of the sheets in which foams were formed was lower, the interlayer film for a laminated glass was found having a more excellent defoaming property. The results of the test were evaluated based on the following standard.

⊚: One sheet of laminated glass was found foaming.
◯: Four sheets of laminated glass were found foaming.

TABLE 1

|  | Sound-insulating layer | | Interlayer film for a laminated glass | | | | Evaluation | | |
| --- | --- | --- | --- | --- | --- | --- | --- | --- | --- |
|  | Minimum thickness (μm) | Maximum thickness (μm) | Minimum thickness (μm) | Maximum thickness (μm) | Wedge angle (mrad) | Cross-sectional shape | TL value (dB) | Occurrence of double image | Defoaming property |
| Example 1 | 100 | 150 | 800 | 1200 | 0.40 | FIG. 2 | 37 | ◯ | ◯ | ⊚ |
| Example 2 | 100 | 150 | 700 | 1100 | 0.30 | FIG. 2 | 36 | ◯ | ◯ | ⊚ |
| Example 3 | 80 | 200 | 600 | 1200 | 0.58 | FIG. 2 | 35 | ◯ | ◯ | ⊚ |
| Comparative Example 1 | 100 | 120 | 700 | 800 | 0.08 | FIG. 2 | 37 | ◯ | × | ⊚ |
| Comparative Example 2 | 15 | 30 | 800 | 1200 | 0.40 | FIG. 2 | 31 | × | ◯ | ⊚ |
| Comparative Example 3 | 20 | 30 | 300 | 450 | 0.30 | FIG. 2 | 31 | × | ◯ | ⊚ |
| Comparative Example 4 | 100 | 150 | 800 | 1600 | 0.80 | FIG. 2 | 37 | ◯ | × | ⊚ |

Examples 4 and 5

Each interlayer film for a laminated glass was produced in the same manner as Example 1, except that the cross-sectional shape was adjusted to be the wedge shape as shown in FIG. 1 and the thickness of the sound-insulating layer, the thickness of the interlayer film for a laminated glass, and the wedge angle were changed as shown in Table 2.

Comparative Examples 5 and 6

Each interlayer film for a laminated glass was produced in the same manner as Example 1, except that the cross-sectional shape was adjusted to be the wedge shape as shown in FIG. 1 and the thickness of the sound-insulating layer, the thickness of the interlayer film for a laminated glass, and the wedge angle were changed as shown in Table 2.

<Evaluation>

With respect to each interlayer film for a laminated glass obtained in Examples 4 and 5 and Comparative Examples 5 and 6, same evaluations carried out for Examples 1 to 3 and Comparative Examples 1 to 4 were carried out. The results are shown in Table 2.

TABLE 2

| | Sound-insulating layer | | Interlayer film for a laminated glass | | | | Evaluation | | |
|---|---|---|---|---|---|---|---|---|---|
| | Minimum thickness (μm) | Maximum thickness (μm) | Minimum thickness (μm) | Maximum thickness (μm) | Wedge angle (mrad) | Cross-sectional shape | TL value (dB) | Occurrence of double image | Defoaming property |
| Example 4 | 100 | 100 | 800 | 1200 | 0.40 | FIG. 1 | 36 ○ | ○ | ○ |
| Example 5 | 110 | 110 | 600 | 1200 | 0.58 | FIG. 1 | 35 ○ | ○ | ○ |
| Comparative Example 5 | 100 | 100 | 800 | 890 | 0.08 | FIG. 1 | 36 ○ | × | ○ |
| Comparative Example 6 | 15 | 15 | 800 | 1200 | 0.40 | FIG. 1 | 30 × | ○ | ○ |

Example 6

An interlayer film for a laminated glass was produced in the same manner as Example 1, except that the cross-sectional shape was adjusted to be the wedge shape as shown in FIG. 3 and the thickness of the sound-insulating layer, the thickness of the interlayer film for a laminated glass, and the wedge angle were changed as shown in Table 3.

Comparative Example 7

An interlayer film for a laminated glass was produced in the same manner as Example 1, except that the cross-sectional shape was adjusted to be the wedge shape as shown in FIG. 3 and the thickness of the sound-insulating layer, the thickness of the interlayer film for a laminated glass, and the wedge angle were changed as shown in Table 3.

<Evaluation>

With respect to each interlayer film for a laminated glass obtained in Example 6 and Comparative Example 7, same evaluations carried out for Examples 1 to 3 and Comparative Examples 1 to 4 were carried out. The results are shown in Table 3.

Examples 7 and 8

An interlayer film for a laminated glass was produced in the same manner as Example 1, except that the cross-sectional shape was adjusted to be the wedge shape as shown in FIG. 4 and the thickness of the sound-insulating layer, the thickness of the interlayer film for a laminated glass, and the wedge angle were changed as shown in Table 4. The shape assisting layer was produced by using the resin with the same composition as that of the resin used for producing the protection layer in Example 1.

Comparative Examples 8 and 9

An interlayer film for a laminated glass was produced in the same manner as Example 1, except that the cross-sectional shape was adjusted to be the wedge shape as shown in FIG. 4 and the thickness of the sound-insulating layer, the thickness of the interlayer film for a laminated glass, and the wedge angle were changed as shown in Table 4. The shape assisting layer was produced by using the resin with the same composition as that of the resin used for producing the protection layer in Example 1.

<Evaluation>

With respect to each interlayer film for a laminated glass obtained in Examples 7 and 8 and Comparative Examples 8 and 9, same evaluations carried out for Examples 1 to 3 and Comparative Examples 1 to 4 were carried out. The results are shown in Table 4.

TABLE 3

| | Sound-insulating layer | | Interlayer film for a laminated glass | | | | Evaluation | | |
|---|---|---|---|---|---|---|---|---|---|
| | Minimum thickness (μm) | Maximum thickness (μm) | Minimum thickness (μm) | Maximum thickness (μm) | Wedge angle (mrad) | Cross-sectional shape | TL value (dB) | Occurrence of double image | Defoaming property |
| Example 6 | 100 | 100 | 800 wedge shape protection layer: 350 rectangular shape protection layer: 350 | 1200 wedge shape protection layer: 750 rectangular shape protection layer: 350 | 0.40 | FIG. 3 | 36 ○ | ○ | ○ |
| Comparative Example 7 | 100 | 100 | 800 wedge shape protection layer: 350 rectangular shape protection layer: 350 | 900 wedge shape protection layer: 450 rectangular shape protection layer: 350 | 0.08 | FIG. 3 | 36 ○ | × | ○ |

TABLE 4

| | Sound-insulating layer | | Interlayer film for a laminated glass | | | | Evaluation | | |
|---|---|---|---|---|---|---|---|---|---|
| | Minimum thickness (μm) | Maximum thickness (μm) | Minimum thickness (μm) | Maximum thickness (μm) | Wedge angle (mrad) | Cross-sectional shape | TL value (dB) | Occurrence of double image | Defoaming property |
| Example 7 | 100 | 100 | 900<br>wedge shape protection layer: 200<br>rectangular shape protection layer: 200<br>shape assisting layer: 400 | 1300<br>wedge shape protection layer: 200<br>rectangular shape protection layer: 200<br>shape assisting layer: 800 | 0.40 | FIG. 4 | 36 | ○ | ○ |
| Example 8 | 100 | 100 | 900<br>wedge shape protection layer: 200<br>rectangular shape protection layer: 200<br>shape assisting layer: 400 | 1550<br>wedge shape protection layer: 200<br>rectangular shape protection layer: 200<br>shape assisting layer: 1050 | 0.58 | FIG. 4 | 36 | ○ | ○ |
| Comparative Example 8 | 100 | 100 | 900<br>wedge shape protection layer: 200<br>rectangular shape protection layer: 200<br>shape assisting layer: 400 | 1100<br>wedge shape protection layer: 200<br>rectangular shape protection layer: 200<br>shape assisting layer: 600 | 0.08 | FIG. 4 | 36 | × | ○ |
| Comparative Example 9 | 15 | 15 | 900<br>wedge shape protection layer: 200<br>rectangular shape protection layer: 285<br>shape assisting layer: 400 | 1300<br>wedge shape protection layer: 200<br>rectangular shape protection layer: 285<br>shape assisting layer: 800 | 0.40 | FIG. 4 | 30 | × | ○ |

INDUSTRIAL APPLICABILITY

According to the present invention, it is made possible to provide an interlayer film for a laminated glass excellent in a sound-insulating property, which is preferably usable for a head up display and the like wherein a driver can look at the front view and an instrument display simultaneously without requiring to look down, and to provide a laminated glass.

EXPLANATION OF SYMBOLS

Figure 1:
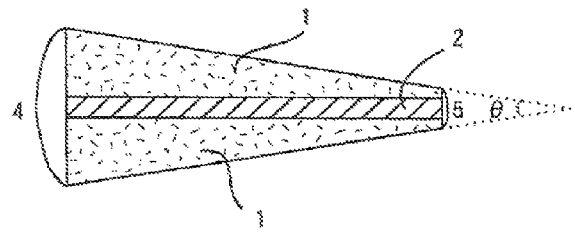
FIG. 1 is a drawing schematically showing a cross-sectional drawing of an interlayer film for a laminated glass of the present invention.
Figure 2:
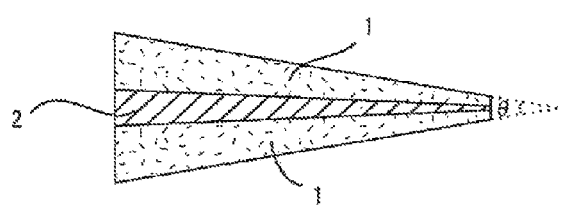
FIG. 2 is a drawing schematically showing a cross-sectional drawing of an interlayer film for a laminated glass of another embodiment of the present invention.
Figure 3:
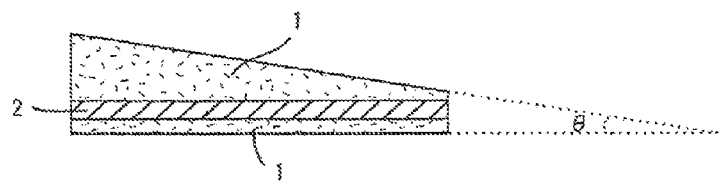
FIG. 3 is a drawing schematically showing a cross-sectional drawing of an interlayer film for a laminated glass of another embodiment of the present invent ion.
Figure 4:
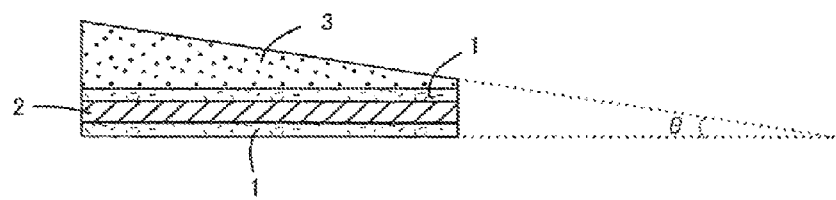
FIG. 4 is a drawing schematically showing a cross-sectional drawing of an interlayer film for a laminated glass of another embodiment of the present invention.

1 a protection layer
2 a soured-insulating layer
3 a shape assisting layer
4 the maximum thickness
5 the minimum thickness

What is claimed is:

1. An interlayer film for a laminated glass, which comprises at least a pair of protection layers and a sound-insulating layer sandwiched between the pair of the protection layers, and which has a wedge shape as a cross-sectional shape, a wedge angle θ of 0.1 to 0.7 mrad, the maximum thickness of 2000 μm or thinner, and the minimum thickness of 400 μm or thicker, the minimum thickness of the sound-insulating layer being 20 μm or thicker wherein the sound-insulating layer comprises a polyvinyl acetal resin and a plasticizer, and the content of the plasticizer in the sound-insulating layer is 50 parts by weight or more to 100 parts by weight of the polyvinyl acetal resin, wherein the sound-insulating layer has a wedge shape as its cross-sectional shape, and wherein the protection layers has a wedge shape as its cross-sectional shape.

2. A laminated glass, which is obtained by using the interlayer film for a laminated glass according to claim 1.

3. The interlayer film for a laminated glass according to claim 1, wherein the protection layer and/or the sound-insulating layer contain a heat-insulating agent.

4. The interlayer film for a laminated glass according to claim 1, which further comprises a shape assisting layer laminated on at least one layer of the pair of the protection layers.

5. The interlayer film for a laminated glass according to claim 4, wherein the protection layer, the sound-insulating layer, and/or the shape assisting layer contain a heat-insulating agent.

6. A laminated glass, which is obtained by using the interlayer film for a laminated glass according to claim 5.

7. The interlayer film for a laminated glass according to claim 4, wherein the protection layer and/or the sound-insulating layer contain a heat-insulating agent.

8. A laminated glass, which is obtained by using the interlayer film for a laminated glass according to claim 7.

9. A laminated glass, which is obtained by using the interlayer film for a laminated glass according to claim 4.

* * * * *